Figure 1:
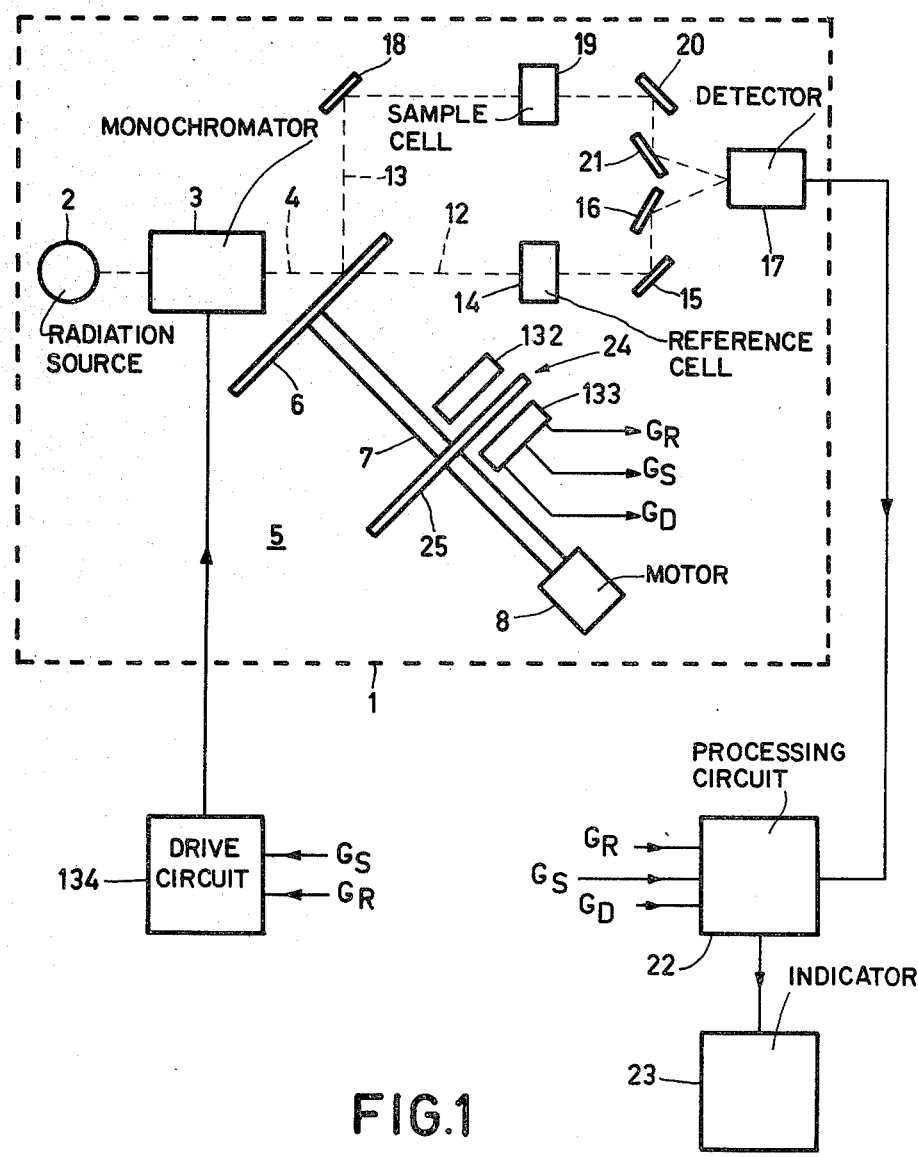

United States Patent [19]
Perkins et al.

[11] 4,305,663
[45] Dec. 15, 1981

[54] SPECTROPHOTOMETER

[75] Inventors: Charles V. Perkins, Cambridge; John R. Firth, Silverstone, both of England

[73] Assignee: Pye (Electronic Products) Limited, Cambridge, England

[21] Appl. No.: 125,011

[22] Filed: Feb. 27, 1980

[30] Foreign Application Priority Data

Mar. 2, 1979 [GB] United Kingdom ............... 07535/79
Mar. 5, 1979 [GB] United Kingdom ............... 07617/79

[51] Int. Cl.³ .......................... G01J 3/08; G01J 3/42
[52] U.S. Cl. .......................................................... 356/323
[58] Field of Search ............................... 356/319–321, 356/323–326

[56] References Cited

U.S. PATENT DOCUMENTS

| | | | |
|---|---|---|---|
| 3,563,656 | 2/1971 | Helms | 356/326 |
| 3,843,259 | 10/1974 | Tohyama et al. | 356/325 |
| 4,171,913 | 10/1979 | Wildy et al. | 356/325 |

Primary Examiner—F. L. Evans
Attorney, Agent, or Firm—Thomas A. Briody; Robert T. Mayer; Paul R. Miller

[57] ABSTRACT

A dual beam spectrophotometer includes a radiation chopper, a monochrometer, and a diffraction grating moved by a stepper motor. The chopper includes a gate pulse generator which produces gate pulses $G_S$ and $G_R$ corresponding to periods during which radiation from the source passes through a sample cell and a reference cell respectively. A stepper motor drive circuit produces pulses to step the stepper motor which are synchronized with the chopping cycle by means of the $G_R$ and $G_S$ pulses. The stepper motor is arranged to step an equal number of times in each half of a chopping cycle. A further condition which is preferably satisfied is that the first pulse of a sequence should start in the opposite half of the chopping cycle from that in which the first pulse started in a previous chopping cycle. At low stepping rates the motor will step twice in one chopping cycle and then pause for several cycles before again stepping twice.

4 Claims, 7 Drawing Figures

SPECTROPHOTOMETER

The present invention relates to a dual beam spectrophotometer.

Dual beam spectrophotometers comprise a radiation source, which may emit radiation in the infra-red, visible or ultra-violet regions of the spectrum, an optical system which directs the radiation through sample and reference cells, a monochromator for selecting a desired band of wavelengths of the radiation, a detector for detecting the radiation, and processing circuitry for processing the signals produced by the detector and for producing an output signal which depends on a characteristic, such as the transmittance, of the sample substance.

The optical system includes a radiation chopping device which causes a composite beam of radiation to fall on the detector, the composite beam comprising successive cycles made up of four periods. During the first (dark) period radiation from the source is prevented from reaching the detector, during the second (sample) period radiation from the source reaches the detector via a path which includes a sample cell, during the third (dark) period radiation from the source is prevented from reaching the detector, and during the fourth (reference) period radiation from the source reaches the detector via a path which includes a reference cell. The chopping device which conventionally comprises a rotating mirror having sectors which are in sequence radiation absorbing, radiation reflecting, radiation absorbing and radiation transparent may be placed either before or after the sample and reference cells as may the monochromator. If the chopping device is placed between the source and sample and reference cells they will receive pulses of radiation and a combining device is required subsequently to produce the composite beam. If the chopping device is placed between the sample and reference cells and the detector, radiation is continuously passed through the cells and alternately directed onto the detector by the chopping means. The mirror is rotated by an electric motor to produce a desired chopping cycle frequency, typically 20 Hz.

The monochromator includes a diffraction grating which is rotated by a stepper motor to select a particular narrow band of wavelengths of the radiation. Each step of the stepper motor produces a given angle of rotation of the grating and selects a given wavelength band from the monochromator.

In prior instruments the stepper motor pulses are free running and not synchronised with the composite waveform or chopping cycle. The energy emitted by the source may vary with wavelength and furthermore the atmosphere between the source and detector may selectively absorb radiation at certain wavelengths. In infra-red instruments radiation absorption by water vapour and carbon dioxide varies sharply with changing wavelength. This causes distortion in the 100% transmittance level which, dependent on the relative time of change of wavelength with respect to the chopping cycle, may become unacceptable.

It is an object of the invention to provide a spectrophotometer in which the distortion of the 100% transmittance level due to changes in absorbance of the atmosphere with changing wavelength of radiation is reduced.

According to the invention there is provided a dual beam spectrophotometer including a source of radiation, a radiation detector, a first path from the source to the detector including a sample cell, a second path from the source to the detector including a reference cell, radiation chopper means for producing a composite beam of radiation at the detector responsive to successive chopping cycles each of which comprises a first dark period during which radiation from the source to the detector is interrupted, a second sample period during which radiation passes from the source to the detector via the sample cell, a third dark period during which radiation from the source to the detector is interrupted, and a fourth reference period during which radiation passes from the source to the detector via the reference cell, a monochromator which includes a diffraction grating driven by a stepper motor and a stepper motor drive circuit, wherein the detector produces a composite electrical signal waveform representative of the radiation falling thereon and is connected to a processing circuit which computes the transmittance of the sample from the magnitudes of the latest of the sample period and reference period radiations at the detector after each updating of a sample period radiation and after each updating of a reference period radiation, characterised in that the stepper motor drive circuit is arranged to be synchronised with the chopper means and to produce an equal number of stepping pulses in each half of a chopping cycle.

This produces a symmetrical ripple on the 100% transmittance level when the atmosphere absorption is changing linearly with wavelength and the stepper motor steps are equal. This ripple can be filtered to produce a constant value for the 100% transmittance level. The instrument time constant typically is greater than several cycles of the chopping frequency and hence the ripple, which will be dependent on the chopping frequency, can be reduced by filtering without affecting the displayed results.

It is convenient to produce the stepper motor pulses such that the motor is stepped during the dark periods so that by the time the sample and reference periods occur the output of the monochromator has settled.

When the stepping rate of the stepper motor is less than twice the chopping cycle frequency the number of pulses in each half of a cycle of the composite waveform is one. As the stepping rate decreases an increasing number of cycles of the composite waveform occur between the steps but a pair of steps is always generated in one cycle.

Stepper motors, however, can given unequal steps under load due to differences in the characteristics between the sets of motor coils and this frequently gives rise to alternate large and small steps. This has the effect of producing an asymmetric ripple on the 100% transmittance line and to reduce this asymmetry the first pulse of successive pairs of pulses may be produced alternately during the first half and the second half of a cycle of a chopping cycle.

The first pulse of one pair may be produced to step the stepper motor during the dark period preceding the reference period of one chopping cycle and the first pulse of the next pair produced to step the stepper motor during the dark period preceding the sample period of a later chopping cycle.

Figure 2:
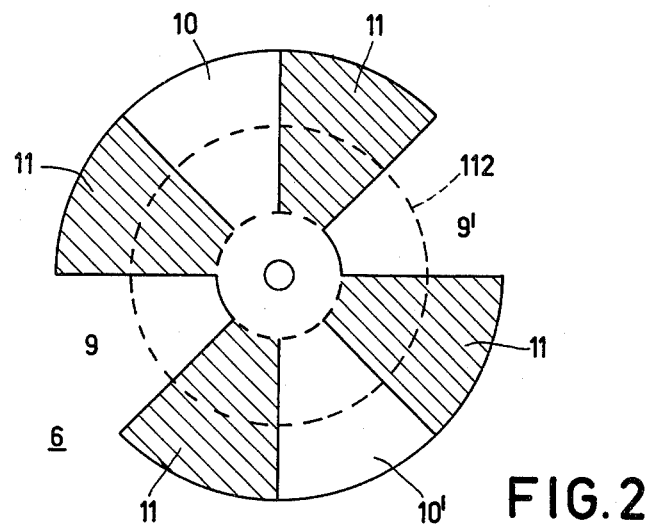
Figure 3:
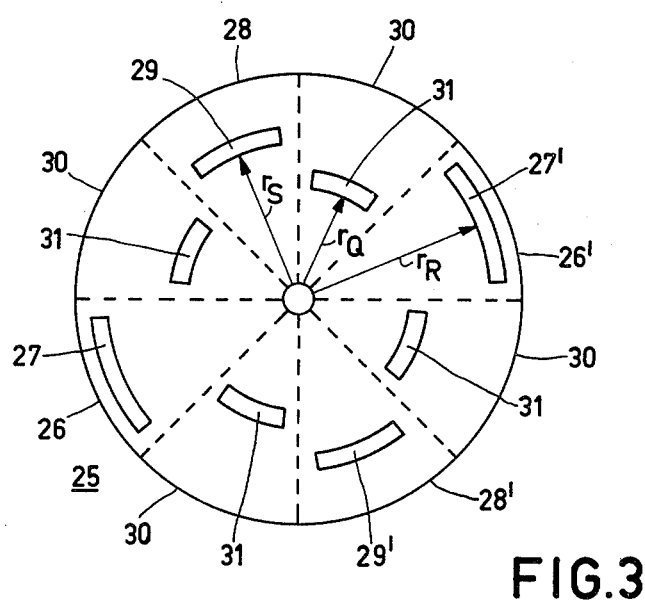
Figure 4:
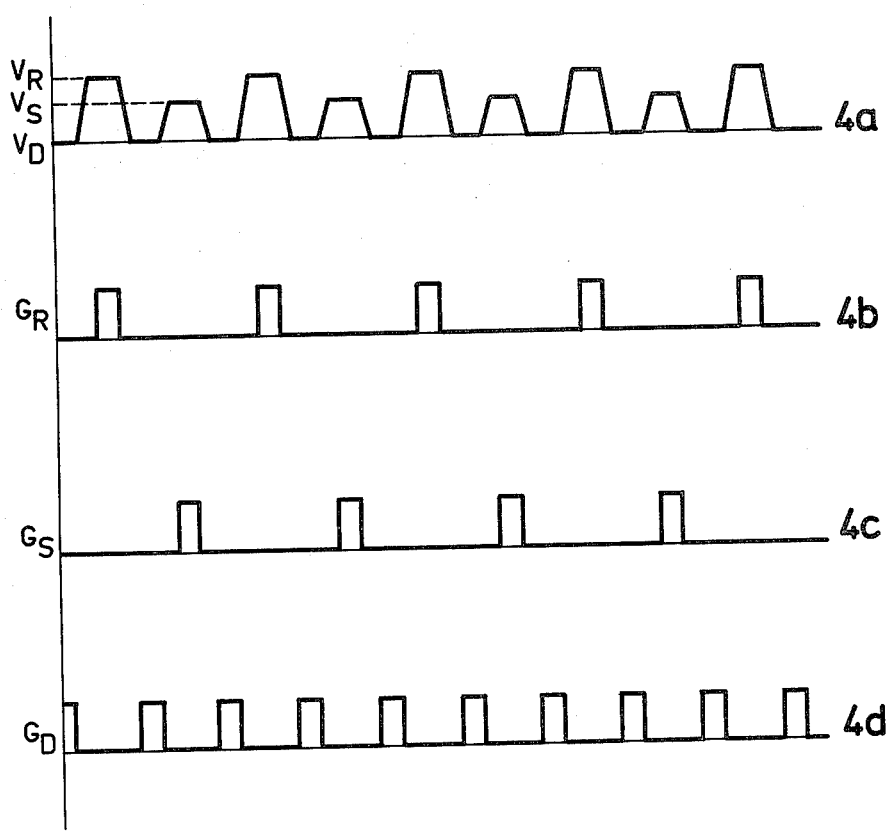
Figure 5:
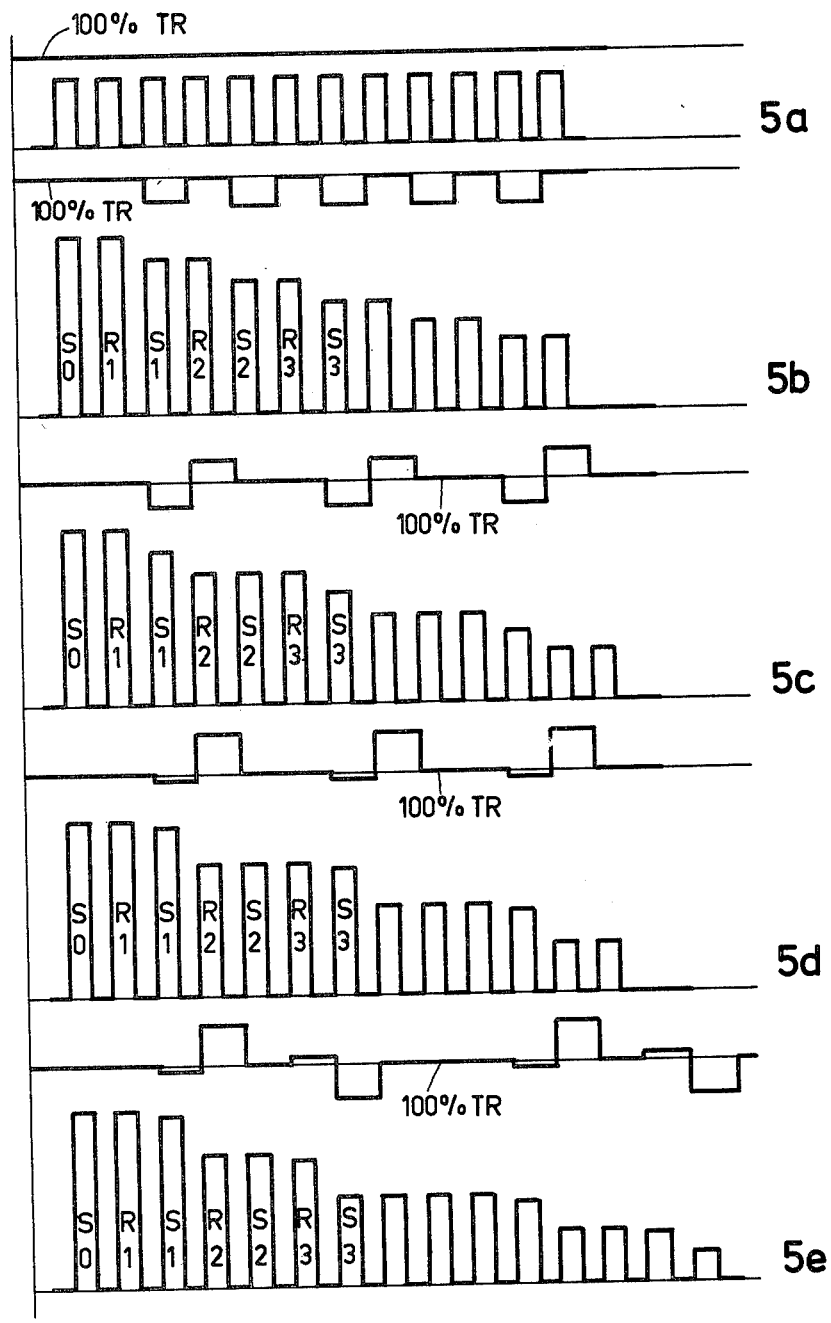
Figure 6:
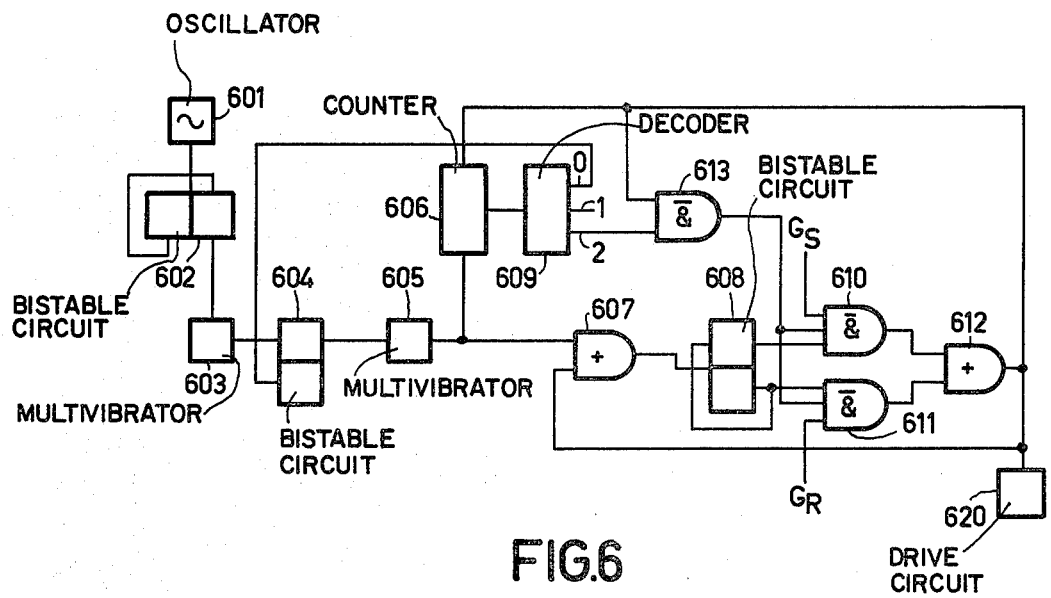
Figure 7:
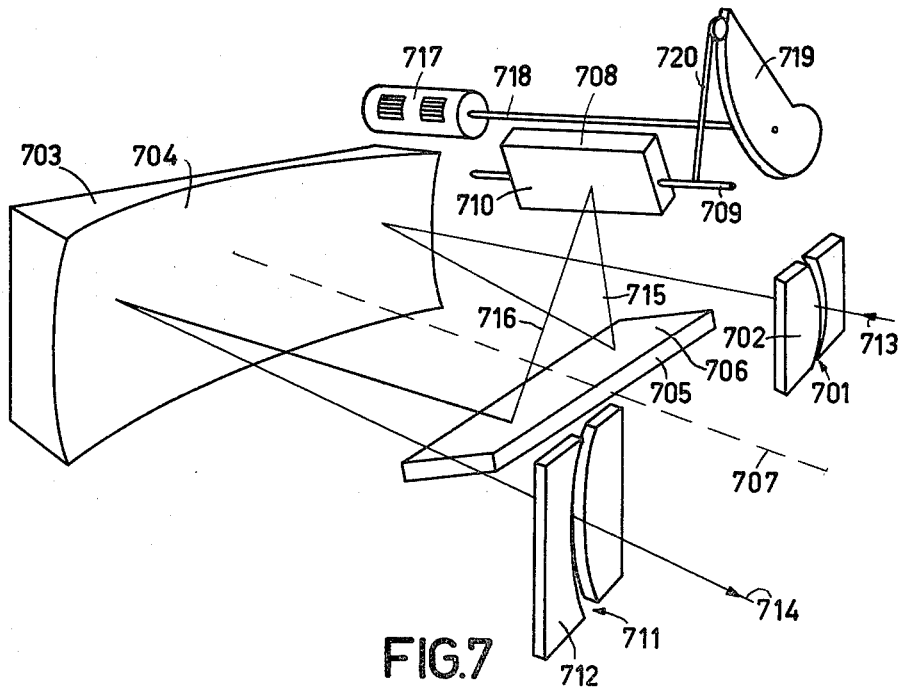

An embodiment of the invention will now be described, by way of example, with reference to the accompanying drawings in which:

FIG. 1 is a block schematic diagram of a dual beam spectrophotometer incorporating a stepper motor drive circuit according to the invention, FIG. 2 is a plan view of a beam chopper disc for use in the apparatus of FIG. 1, FIG. 3 is a plan view of an optical encoder disc for use in the apparatus of FIG. 1, FIGS. 4(a-d) illustrate waveforms at various points in the apparatus, FIGS. 5(a-e) illustrate the effect of changing absorbance of the atmosphere on the 100% transmittance level, FIG. 6 shows a stepper motor drive circuit suitable for use with the spectrophotometer shown in FIG. 1, and FIG. 7 shows a monochromator in which a diffraction grating is driven by a stepper motor.

Referring first to FIG. 1, the basic optical elements of a dual beam spectrophotometer of known type are represented schematically within the broken rectangle 1, and comprise a radiation source 2 from which radiation having a range of wavelengths passes to a monochromator 3. A beam 4 of substantially monochromatic radiation emerges from the monochromator 3 and is incident upon a beam splitting device (chopper) indicated generally by the reference numeral 5. The chopper 5 comprises a disc 6 mounted upon a shaft 7 for rotation therewith. The shaft 7 is rotated by a motor 8.

At least an outer annular portion of the disc 6 is divided into n sectors where n is a multiple of 4, successive sectors being transparent, absorbent, reflecting and absorbent to the radiation. A typical arrangement is illustrated in FIG. 2, in which an outer annular portion of the disc 6 comprises eight sectors. Two diametrically-opposed sectors 9, 9' are removed to leave corresponding gaps in the outer annular portion of the disc 6. Two further diametrically-opposed sectors 10, 10', disposed orthogonally with respect to the sectors 9, 9', are provided with highly reflective surfaces. The four sectors 11 lying between the sectors 9, 10, 9' and 10' are provided with surfaces which are substantially 100% absorbent to radiation. Typically the surfaces of the sectors 11 are coated with black velvet material.

The shaft 7 is located so that the beam 4 is incident on the outer annular portion of the disc 6 in a locus as shown by the broken circle 112 in FIG. 2, and at an angle of 45° to the plane of the disc. As the disc 6 rotates, the beam 4 will be incident successively on the various sectors. When it is incident upon either of the sectors 9 or 9', the radiation will pass undeflected along the path 12. When the radiation is incident on either of the sectors 10, 10', it will be reflected along the path 13, and when incident on the sectors 11 the radiation is absorbed. The chopper thus produces a first train of pulses of radiation along the path 12 and a second train along the path 13, the pulses of the two trains being interlaced, and with dark intervals between successive pulses.

The radiation pulse train along the path 12 passes through a reference cell 14 and is deflected by mirrors 15, 16 to fall on a radiation detector 17.

The radiation pulse train along the path 13 is deflected by a mirror 18 to pass through a sample cell 19 and is then further deflected by mirrors 20, 21 to fall on the radiation detector 17.

It is apparent that the radiation detector 17 will produce an electrical output signal comprising two interlaced trains of pulses, the amplitude $V_R$ of the pulses of the one (reference) train being representative of the intensity of the radiation pulses reaching the detector via the reference cell 14, and the amplitude $V_S$ of the pulses of the other (sample) train being representative of the intensity of the radiation pulses reaching the detector via the sample cell 19. In the intervals between pulses, when no radiation reaches the detector by either route, the detector output signal has an amplitude $V_D$ (the dark level) which is a measure of the background radiation. The output signal from the detector 17 is therefore a composite signal of the form shown in FIG. 4 at (a) and is fed to a processing circuit 22 and indicating means 23 which may be, for example, a chart recorder.

A gate pulse generator indicated generally by the reference 24, is associated with the chopper 5, and comprises an encoder disc 25 mounted on the shaft 7 for rotation synchronously with the chopper disc 6. As shown in FIG. 3 the disc 25, which is generally opaque, is notionally divided into sectors corresponding to the sectors of the disc 6.

In the sectors 26, 26', corresponding respectively to the sectors 9, 9' of the disc 6, there are provided translucent annular slots 27, 27', at a radius $r_R$ from the centre of the disc. Similarly, in the sectors 28, 28' corresponding to sectors 10, 10' of the disc 6, there are provided translucent annular slots 29, 29' at a radius $r_S$ from the centre of the disc 25. In each of the sectors 30, corresponding to the sectors 11 of the disc 6, there is provided a translucent annular slot 31 at a radius $r_D$ from the centre of the disc 25.

At one side of the disc 25 there is provided a light source 132, and at the other side a detector array 133 comprising three light detectors, e.g. photodiodes, the arrangement being such that light passing through the slots 27 falls only on a first photodiode, light passing through the slots 29 falls only on a second photodiode and light through the slots 31 falls only on a third photodiode. Consequently, as the disc 23 is rotated in synchronism with the chopper, the first photodiode produces a train of gate pulses $G_R$ in synchronism with the reference radiation pulses, the second photodiode produces a train of gate pulses $G_S$ in synchronism with the sample radiation pulses, and the third photodiode produces a train of gate pulses $G_D$ in synchronism with the dark pulses. In each case, the angular extent of the slots 27, 29 and 30 is made somewhat less than the angular width of the corresponding sectors of the chopper disc 6 so that the respective gate pulses are narrower than and lie wholly within the corresponding pulses of the composite signal. Moreover the output signals from the three photodiodes may be amplified and limited in conventional fashion to provide substantially square-edged gate pulses as shown at FIG. 4 at (b) for the reference gate pulses $G_R$, at (c) for the sample gate pulses $G_S$ and at (d) for the dark gate pulses $G_D$.

The monochromator 3 includes a diffraction grating which is rotated about an axis by means of a stepper motor to select a desired narrow band of wavelengths. A stepper motor drive circuit 134 produces drive pulses for the stepper motor which are synchronised with the $G_R$ and $G_S$ pulses.

In prior art circuits the stepper motor drive for the diffraction grating has been free running i.e. not synchronised with the chopping cycle and when the step frequency for the stepper motor is the same as the chopping frequency errors in the 100% transmittance line may be produced. FIG. 5 (a) and (b) illustrates the case where this occurs and the effect it has when the absorption of radiation by the atmosphere changes with changing wavelength. FIG. 5a shows that in the case where the energy reaching the detector is constant with wavelength i.e. there is no change in the absorption of radiation with changing wavelength, the rate at which the wavelength is stepped is unimportant and the 100% transmittance level remains constant. FIG. 5(b) shows the case where the energy decreases with changing wavelength. It is assumed that the stepper motor steps during the dark period preceding the sample period in each chopping cycle. Transmittance is the ratio of the energy S emerging from the sample cell to the energy R emerging from the reference cell and is computed in each reference and sample period. Hence as shown in FIG. 5b the transmittance will be equal successively to S0/R1, S1/R1, S1/R2, S2/R2 and so on. It can be seen that this results in a cyclic ripple on the 100% transmittance level and although the ripple can be filtered the 100% transmittance level will have a net value offset from the true value.

To overcome this problem the stepper motor drive circuit produces drive pulses to the stepper motor such that during one chopping cycle any number of stepping pulses produced in the first half of the cycle is repeated by the same number of stepping pulses in the second half of the cycle. The chopping cycle in this context may begin at any time in relation to the ref sample and dark periods and lasts until the corresponding repeated part of the cycle. FIG. 5(c) illustrates the effect of this arrangement of stepper motor pulses. The transmittance will again be equal successively to S0/R1, S1/R1, S1/R2, S2/R2 and so on. This produces a ripple on the 100% transmittance level but the ripple is now symmetrical about the 100% transmittance level and hence after filtering no net offset is produced.

In principle this should suffice to cure the problem of deviation in the 100% transmittance level and does in fact produce an improvement. However, stepper motors do not always give equal steps when under load, due to differences in the characteristics between the sets of motor coils and their driving circuits. This frequently causes the stepper motor to produce alternate large and small steps. FIG. 5(d) shows the result of the alternate large and small steps and it can be seen that this results in an asymmetric ripple on the 100% transmittance level and hence even after filtering a net offset of the 100% transmittance level will be produced.

To overcome this problem the stepper motor is driven so that if the first pulse of one pair of pulses occurs during one half cycle of the composite waveform the first pulse of the next pair of pulses to the motor occurs during the other half of a subsequent cycle of the composite waveform. Thus, for example, as illustrated in FIG. 5(e) if the first pulse of one pair of pulses occurs during the dark period preceding a sample period of one cycle of the composite waveform, the first pulse of the next pair of pulses is arranged to occur during the dark period preceding a reference period of a subsequent cycle of the composite waveform. Each pair of pulses is separated by an interval which brings the average stepping rate to a desired value. As can be seen from FIG. 5(e) while each pair of asymmetric about the 100% transmittance level when successive pairs are considered a symmetrical ripple is produced which may then be filtered without producing a net offset on the 100% transmittance level.

It will be appreciated that while each pair of pulses may be separated by an odd integral number of half cycles two pairs must be completed well within the instrument time constant to enable efficient filtering to be achieved. The separation between successive pairs will depend on the average step rate required.

FIG. 6 shows one form the stepper motor drive circuit 134 may take. A free running oscillator 601 produces pulses at the desired stepping rate of the stepper motor and these pulses are applied to the clock input of a D-type bistable circuit 602 which divides the frequency by two. The output of bistable circuit 602 triggers a monostable multivibrator 603 which produces a short pulse to set a bistable circuit 604 the output of which in turn triggers a further monostable multivibrator 605 which produces a short pulse to reset a counter circuit 606 and via an OR gate 607 clocks a D-type bistable circuit 608. A decoder 609 which decodes the counter output consequently produces a signal on its zero output which resets the bistable circuit 604. The Q output of bistable circuit 608 is connected to a first input of a NAND gate 610 while the $\overline{Q}$ output is connected to a first input of a NAND gate 611. The outputs of NAND gates 610 and 611 are fed to first and second inputs of an OR gate 612 the output of which provides pulses which are fed to a driver circuit 620 for the stepper motor. The timing signal $G_S$ is fed to a second input of NAND gate 610 while the timing signal $G_R$ is fed to a second input of NAND gate 611. Hence when bistable circuit 608 is set an output pulse is produced when the signal $G_S$ is present i.e. during the sample period and when bistable circuit 608 is reset an output pulse is produced when the signal $G_R$ is present i.e. during the reference period. The output pulses from OR gate 612 are fed to the clock input of bistable circuit 608 via OR gate 607 and to the clock input of counter 606. Thus after the first pulse is produced the counter is clocked on by one count and the bistable 608 changes state. Hence, assuming that the bistable circuit 608 is set and consequently the first output pulse is produced at the start of the sample period, the next output pulse will be produced at the start of the following reference period as the first output pulse to cause bistable circuit 608 to be reset. The second pulse will again cause the counter to be clocked on and hence an output will be produced at output 2 of the decoder which through a NAND gate 613 applies an inhibit signal to third inputs of NAND gates 610 and 611 to prevent further pulses being produced. At the same time the bistable circuit 608 will again be clocked so that it is again set. When the next oscillator pulse occurs the counter 606 is again reset and bistable circuit 608 clocked. Hence bistable circuit 608 is in the opposite state to that which existed when the previous pulse pair was initiated. Therefore the first pulse of the pair will occur at the start of the reference period and the second at the start of the following sample period. The function of the bistable circuit 602 is to divide the oscillator frequency by two to maintain the overall stepping rate when the pairs of pulses are produced. It would, of course, be possible to allow for the generation of the pairs of pulses when determining the oscillator frequency.

The step pulses at the output of OR gate 612 are applied to a stepper motor drive circuit 620 which applies the appropriate waveforms to the coils of the stepper motor in known manner. The stepper motor is preferably driven on the trailing edge of the pulse produced by OR gate 612 as it will then cause the grating to move, and hence the wavelength of the radiation emitted by the monochromator to change, during the dark periods thus allowing the optical system to settle before measurements are made.

FIG. 7 shows one form of monochromator which includes a diffraction grating driven by a stepper motor. The monochromator includes an entrance slit 701 formed in a slit plate 702; a planoconcave spherical collimator mirror 703 with a reflective surface 704; a plane mirror 705, with a reflective surface 706, mounted upon the central optical axis 707 of mirror 703 and inclined to it; a plane diffraction grating 708 mounted for rotation about an axis, coincident with a shaft 709, parallel to the grooves upon the active face 710 of the grating and parallel to the central optical axis 707 of mirror 703; and an exit slit 711 formed in a slit plate 712. Slit plates 702 and 712 lie in, or on a plane closely adjacent and parallel to, the focal plane of mirror 703 and slits 701 and 711 are disposed about the circumference of a circle centered upon the central optical axis 707 of mirror 703, the so-called Ebert circle.

From a suitable source (not shown) a beam of light brought to a focus in slit 701 is collimated by mirror 703, reflected from mirror 705 and falls upon the active face 710 of plane diffraction grating 708. The dispersed beam from the diffraction grating 708 falls upon mirror 705 and is reflected on to mirror 703 and brought to a focus in the plane of exit slit 711. The line 713 is the optical center line of the beam of light coming into the monochromator through the entrance slit 701 and the line 714 is the optical center line of the beam of light emerging from the monochromator through the exit slit 711.

The plane mirror 705 is inclined at 45° to the central optical axis 707 and deflects both the collimated beam from mirror 703 and the dispersed beam from grating 708 through 90°. The mirror 705 is thus positioned relative to the grating 708 and to concave spherical mirror 703 so as to ensure that the plane defined by the optical center line 715 of the collimated beam from mirror 705 and the optical center line 716 of the dispersed beam from grating 708 intersects the grooves of grating 708 at right angles.

The diffraction grating 708 is rotated by a stepper motor 717 which drives a shaft 718 on which a cam 719 is mounted. A cam follower 720 is mounted on the shaft 709 as in the diffraction grating 708. As the stepper motor 717 steps the diffraction grating 708 is rotated and radiation of a different wavelength is presented at the exit slit 711.

Circuits other than that shown in FIG. 6 could be used to generate the pulses required to drive the stepper motor driver circuit 620. For example, a microprocessor could be used to produce the pairs of pulses.

We claim:

1. A dual beam spectrophotometer including a source of radiation, a radiation detector, a first path from the source to the detector including a sample cell, a second path from the source to the detector including a reference cell, radiation chopper means for producing a composite beam of radiation at the detector responsive to successive chopping cycles each of which comprises a first dark period during which radiation from the source to the detector is interrupted, a second sample period during which radiation passes from the source to the detector via the sample cell, a third dark period during which radiation from the source to the detector is interrupted, and a fourth reference period during which radiation passes from the source to the detector via the reference cell, a monochromator which includes a diffraction grating driven by a stepper motor and a stepper motor drive circuit, wherein the detector produces a composite electrical signal waveform representative of the radiation falling thereon and is connected to a processing circuit which computes the transmittance of the sample from the magnitudes of the latest of the sample period and reference period radiations at the detector after each updating of a sample period radiation and after each updating of a reference period radiation, characterised in that the stepper motor drive circuit is synchronised with the chopper means and produces an equal number of stepping pulses in each half of a chopping cycle.

2. A spectrophotometer as claimed in claim 1 in which the number is one.

3. A spectrophotometer as claimed in claim 2 in which the first pulse of successive pairs of pulses is produced alternately during the first half and the second half of a chopping cycle.

4. A spectrophotometer as claimed in claim 3 in which the first pulse of one pair is produced to step the stepper motor during the dark period preceding the reference period of one chopping cycle and the first pulse of the next pair is produced to step the stepper motor during the dark period preceding the sample period of a later chopping cycle.

* * * * *